United States Patent
Masuko et al.

(10) Patent No.: US 10,108,639 B2
(45) Date of Patent: Oct. 23, 2018

(54) DISPLAY CONTROL DEVICE, DISPLAY CONTROL DEVICE CONTROL METHOD, PROGRAM AND INFORMATION STORAGE MEDIUM

(71) Applicant: Rakuten, Inc., Tokyo (JP)

(72) Inventors: Soh Masuko, Tokyo (JP); Keiji Shinzato, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 252 days.

(21) Appl. No.: 15/022,931

(22) PCT Filed: Feb. 14, 2014

(86) PCT No.: PCT/JP2014/053553
§ 371 (c)(1),
(2) Date: Mar. 18, 2016

(87) PCT Pub. No.: WO2015/121991
PCT Pub. Date: Aug. 20, 2015

(65) Prior Publication Data
US 2016/0232181 A1    Aug. 11, 2016

(51) Int. Cl.
*G06F 17/30*    (2006.01)
*G06K 9/62*    (2006.01)

(52) U.S. Cl.
CPC .. *G06F 17/30259* (2013.01); *G06F 17/30247* (2013.01); *G06K 9/6202* (2013.01)

(58) Field of Classification Search
CPC ............... G06F 17/30265; G06F 17/30; G06F 17/30247; G06F 17/30256;
(Continued)

(56) References Cited

U.S. PATENT DOCUMENTS

2007/0216950 A1* 9/2007 Yamakado ......... H04N 1/00132
358/1.18
2008/0109327 A1* 5/2008 Mayle ................ G06Q 30/0603
705/27.1
(Continued)

FOREIGN PATENT DOCUMENTS

JP    2003-067401 A    3/2003
JP    2006-236014 A    9/2006
(Continued)

OTHER PUBLICATIONS

English Translation of International Search Report for PCT/JP2014/053552 dated May 13, 2014.
(Continued)

*Primary Examiner* — Dennis Truong
(74) *Attorney, Agent, or Firm* — HEA Law PLLC

(57) ABSTRACT

Based on information being associated with one image among a plurality of images and concerning an object of the one image and information being associated with another image among the plurality of images and concerning an object of the other image, a characteristic information specification unit specifies characteristic information of the object of the one image as compared with the object of the other image. A characteristic information obtaining unit obtains the characteristic information specified by the characteristic information specification unit. A display control unit displays a screen image including a plurality of images on a display unit. Further, the display control unit displays the characteristic information so as to be associated with the one image.

12 Claims, 10 Drawing Sheets

(58) Field of Classification Search
CPC ........... G06F 17/30268; G06F 17/3082; G06F
3/04842; G06Q 30/0603; G06Q 30/0641;
G06Q 30/0643; G06Q 10/087; G06K
9/46; H04N 1/00442; H04N 1/00453;
H04N 2201/0089
USPC ............... 707/728, 729, 737, 752; 358/1.18;
705/27.1
See application file for complete search history.

(56) References Cited

U.S. PATENT DOCUMENTS

| | | | | |
|---|---|---|---|---|
| 2009/0172545 | A1* | 7/2009 | Yokoi | G06F 17/3028 |
| | | | | 715/721 |
| 2009/0248831 | A1* | 10/2009 | Scott | G06F 17/30265 |
| | | | | 709/217 |
| 2010/0134415 | A1* | 6/2010 | Iwase | G06F 1/1626 |
| | | | | 345/158 |
| 2010/0293224 | A1* | 11/2010 | Moriwaki | G06F 17/30241 |
| | | | | 709/203 |
| 2011/0093361 | A1* | 4/2011 | Morales | G06Q 10/087 |
| | | | | 705/26.62 |
| 2014/0089135 | A1* | 3/2014 | Linh | G06Q 30/0601 |
| | | | | 705/26.7 |
| 2015/0134236 | A1* | 5/2015 | Ukai | G06F 17/30265 |
| | | | | 701/410 |
| 2015/0186425 | A1* | 7/2015 | Chang | G06N 5/003 |
| | | | | 707/729 |
| 2015/0206257 | A1* | 7/2015 | Harada | G06F 17/3082 |
| | | | | 382/103 |

FOREIGN PATENT DOCUMENTS

| | | |
|---|---|---|
| JP | 2007-133532 A | 5/2007 |
| JP | 2011-216071 A | 10/2011 |
| JP | 2013-101450 A | 5/2013 |

OTHER PUBLICATIONS

The partial translation of OA for corresponding Patent Application No. JP2014-524972 dated Aug. 19, 2014.

* cited by examiner

| PRODUCT ID | ONOMATOPOEIA | NUMBER OF APPEARANCES |
|---|---|---|
| P1 | "SAKU-SAKU" | 10 |
|  | "FUWA-FUWA" | 2 |
| P3 | "FUWA-FUWA" | 12 |
| P5 | "FUWA-FUWA" | 1 |
| P12 | "KOTTERI" | 8 |

| USER ID | USER NAME | ADDRESS | MAIL ADDRESS |
|---------|-----------|---------|--------------|
| U1 | --- | --- | --- |
| ... | ... | ... | ... |

| SHOP ID | SHOP NAME | MAIL ADDRESS |
|---------|-----------|--------------|
| S1 | --- | --- |
| ... | ... | ... |

FIG.10

| UNIQUE PRODUCT ID | TITLE | CATEGORY |
|---|---|---|
| X1 | --- | --- |
| X2 | --- | --- |
| X3 | --- | --- |
| X4 | --- | --- |
| X5 | --- | --- |
| X6 | --- | --- |
| X7 | --- | --- |
| X8 | --- | --- |
| X9 | --- | --- |
| X10 | --- | --- |
| ... | ... | ... |

FIG.11

| PRODUCT ID | SHOP ID | UNIQUE PRODUCT ID | PRICE | PRODUCT IMAGE | PRODUCT PAGE |
|---|---|---|---|---|---|
| P1 | S1 | X1 | --- | --- | --- |
| P2 | S2 | X2 | --- | --- | --- |
| P3 | S3 | X3 | --- | --- | --- |
| P4 | S1 | X4 | --- | --- | --- |
| P5 | S3 | X5 | --- | --- | --- |
| P6 | S4 | X6 | --- | --- | --- |
| P7 | S2 | X7 | --- | --- | --- |
| P8 | S2 | X8 | --- | --- | --- |
| P9 | S2 | X4 | --- | --- | --- |
| P10 | S1 | X9 | --- | --- | --- |
| P11 | S1 | X10 | --- | --- | --- |
| P12 | S2 | X10 | --- | --- | --- |
| ... | ... | ... | ... | ... | ... |

| TRADE ID | TIME AND DATE | SHOP | PURCHASER | PRODUCT | PRICE |
|---|---|---|---|---|---|
| T1 | --- | S1 | U1 | P1 | 500 YEN |
| ... | ... | ... | ... | ... | ... |

| COMMENT ID | REGISTRANT | PRODUCT ID | COMMENT | EVALUATION RESULT |
|---|---|---|---|---|
| C1 | U1 | P1 | THE OUTER TEXTURE WAS *"SAKU-SAKU"* AND THE INNER TEXTURE WAS *"FUWA-FUWA"*. VERY TASTY. | 4 |
| C2 | U8 | P1 | TASTY. GOOD PRICE. | 3 |
| ... | ... | ... | ... | ... |
| C20 | U25 | P1 | *"SAKU-SAKU"* AND TASTY. | 4 |
| ... | ... | ... | ... | ... |

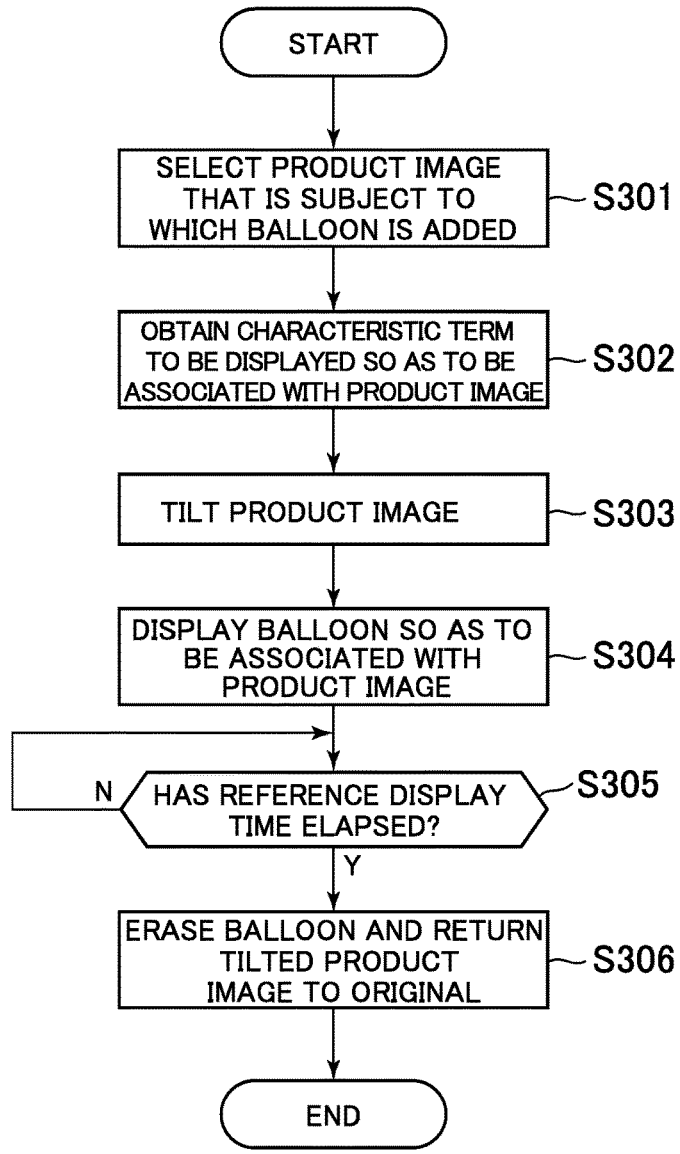

DISPLAY CONTROL DEVICE, DISPLAY CONTROL DEVICE CONTROL METHOD, PROGRAM AND INFORMATION STORAGE MEDIUM

CROSS REFERENCE TO RELATED APPLICATIONS

This application is a National Stage of International Application No. PCT/JP2014/053553 filed on 14 Feb. 2014. The contents of the above document is incorporated herein by reference in its entirety.

TECHNICAL FIELD

The present invention relates to a display control device, a control method for a display control device, a program, and an information storage medium.

BACKGROUND ART

There has been known a display control device for displaying a screen image including a plurality of images on a display unit. According to Patent Literature 1, for example, a plurality of product images are displayed on a display unit of a client terminal.

CITATION LIST

Patent Literature

Patent Literature 1: JP 2007-133532 A

SUMMARY OF INVENTION

Technical Problem

When a user selects at least one of the plurality of images displayed on a screen such as is described above, there is a case in which the user has to rely on a characteristic of the appearance of the object of an image, and information useful to make a selection is not sufficiently available for the user.

The present invention has been conceived in view of the above, and an object thereof is to provide a display control device, a control method for a display control device, a program, and an information storage medium capable of providing useful information to a user who selects at least one image from among a plurality of images.

Solution to Problem

In order to solve the above described problem, a display control device according to the present invention includes characteristic information obtaining means for obtaining characteristic information specified by characteristic information specification means for specifying characteristic information of an object of one image among a plurality of images as compared with an object of another image among the plurality of images based on information being associated with the one image and concerning the object of the one image and information being associated with the other image and concerning the object of the other image; and display control means for displaying a screen image including the plurality of images on display means, and for displaying the characteristic information so as to be associated with the one image.

A control method for a display control device according to the present invention includes a characteristic information obtaining step of obtaining characteristic information specified by characteristic information specification means for specifying characteristic information of an object of one image among a plurality of images as compared with an object of another image among the plurality of images based on information being associated with the one image and concerning the object of the one image and information being associated with the other image and concerning the object of the other image; and a display control step of displaying a screen image including the plurality of images on display means, and of displaying the characteristic information so as to be associated with the one image.

A program according to the present invention causes a computer to function as characteristic information obtaining means for obtaining characteristic information specified by characteristic information specification means for specifying characteristic information of an object of one image among a plurality of images as compared with an object of another image among the plurality of images based on information being associated with the one image and concerning the object of the one image and information being associated with the other image and concerning the object of the other image; and display control means for displaying a screen image including the plurality of images on display means, and for displaying the characteristic information so as to be associated with the one image.

An information storage medium according to the present invention stores a program for causing a computer to function as characteristic information obtaining means for obtaining characteristic information specified by characteristic information specification means for specifying characteristic information of an object of one image among a plurality of images as compared with an object of another image among the plurality of images based on information being associated with the one image and concerning the object of the one image and information being associated with the other image and concerning the object of the other image; and display control means for displaying a screen image including the plurality of images on display means, and for displaying the characteristic information so as to be associated with the one image.

In one embodiment of the present invention, the characteristic information specification means may include means for specifying relative characteristic information of the object of the one image relative to the object of the other image, based on the information associated with the one image and the information associated with the other image.

In one embodiment of the present invention, the information associated with the one image may include text information concerning the object of the one image, the information associated with the other image may include text information concerning the object of the other image, and the characteristic information specification means may include means for specifying a term included in the text information associated with the one image but not included in the text information associated with the other image as the relative characteristic information of the object of the one image relative to the object of the other image.

In one embodiment of the present invention, the characteristic information specification means may include means for specifying characteristic information that is common to the object of the one image and the object of the other image, based on the information associated with the one image and the information associated with the other image, the other image showing an object same as or similar to the object of the one image.

In one embodiment of the present invention, the information associated with the one image may include text information concerning the object of the one image, the information associated with the other image may include text information concerning the object of the other image, and the characteristic information specification means may include means for specifying a term included in the text information associated with the one image and also included in the text information associated with the other image as the characteristic information that is common to the object of the one image and the object of the other image.

In one embodiment of the present invention, the plurality of images showing objects that satisfy a search condition as to an object may be shown in the screen image, and the characteristic information specification means may exclude information set as the search condition from the characteristic information.

Advantageous Effects of Invention

According to the present invention, it is possible to provide useful information to a user who selects at least one image from among a plurality of images.

BRIEF DESCRIPTION OF DRAWINGS

FIG. 4 is a diagram explaining a function which an electronic commerce system is provided with;

FIG. 5 is a diagram explaining a function which an electronic commerce system is provided with;

FIG. 6 is a diagram explaining a function which an electronic commerce system is provided with;

FIG. 10 shows one example of a product basic information table;

FIG. 11 shows one example of a product information table;

FIG. 16 shows another example of processing executed in an electronic commerce system; and FIG. 17 is a diagram explaining a function which an electronic commerce system is provided with.

DESCRIPTION OF EMBODIMENTS

In the following, an example of an embodiment of the present invention will be described in detail, based on the accompanying drawings. In the following, an example will be described in which the present invention is applied to an electronic commerce system for implementing a virtual shopping mall where a plurality of shops are open. That is, an example will be described in which a display control device according to an embodiment of the present invention is implemented in an electronic commerce system.

Figure 1:
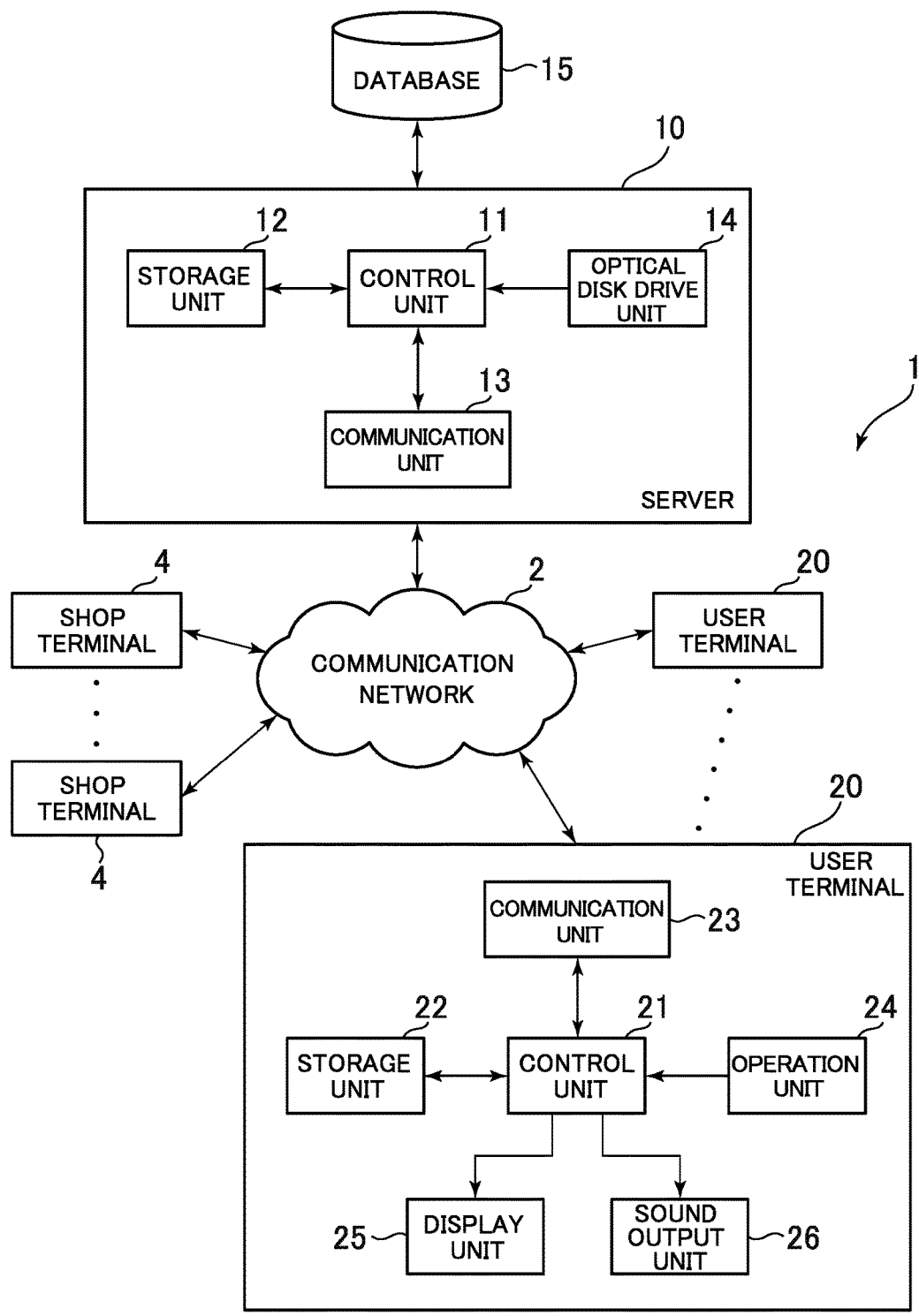
FIG. 1 shows one example of an entire configuration of an electronic commerce system.

FIG. 1 shows one example of an entire configuration of an electronic commerce system 1. As shown in FIG. 1, the electronic commerce system 1 includes a server 10, a database 15, a user terminal 20 (a display control device), and a shop terminal 4. The server 10, the user terminal 20, and the shop terminal 4 are connected to a communication network 2 formed so as to include, for example, the Internet or the like. It is possible to mutually perform data communication between the server 10 and the user terminal 20, and also between the server 10 and the shop terminal 4.

The server 10 is a server that functions as a portal of the virtual shopping mall. As shown in FIG. 1, the server 10 includes a control unit 11, a storage unit 12, a communication unit 13, and an optical disk drive unit 14. The control unit 11 includes one or more microprocessors, and executes information processing according to a program stored in the storage unit 12 (a memory). The storage unit 12 includes a main storage unit (for example, a RAM or the like) and an auxiliary storage unit (for example, a ROM, a hard disk drive, a solid state drive, or the like). The communication unit 13 is used for data communication via the communication network 2.

The optical disk drive unit 14 is used for reading a program or data recorded on an optical disk (an information storage medium). A program and data recorded on an optical disk are read by the optical disk drive unit 14, and are stored in the storage unit 12.

Note that the server 10 may include a component (for example, a memory card slot) for reading a program or data recorded in an information storage medium (for example, a memory card) other than an optical disk, and a program and data may be supplied to the storage unit 12 via an information storage medium other than an optical disk. Further, a program and data may be supplied to the storage unit 12 via the communication network 2.

The server 10 can access the database 15 (a storage device). The database 15 may be included in a server different from the server 10, and may also be included in the server 10. Data stored in the database 15 will be described later.

The user terminal 20 is an information processing device used by a user. For example, the user terminal 20 is a cellular phone (including a smart phone), a tablet computer, a lap top computer, or a desk top computer, or the like.

As shown in FIG. 1, the user terminal 20 includes a control unit 21, a storage unit 22, a communication unit 23, an operation unit 24, a display unit 25, and a sound output unit 26. The control unit 21, the storage unit 22, and the communication unit 23 are similar to the control unit 11, the storage unit 12, and the communication unit 13 of the serer 10, respectively.

A program and data are supplied to the storage unit 22 via the communication network 2. Note that the user terminal 20 may include a component (for example, an optical disk drive unit, a memory card slot, or the like) for reading a program or data stored in an information storage medium (for example, an optical disk, a memory card, or the like). And, a program and data may be supplied to the storage unit 22 via an information storage medium (for example, a memory card).

The operation unit 24 is used by a user to conduct an operation. For example, a pointing device, such as a mouse, a stick, a touch pad, or a touch panel which is overlaid on the display unit 25, corresponds to the operation unit 24.

The display unit 25 is, for example, a liquid crystal display, an organic EL display, or the like, and displays various screen images. The sound output unit 26 is, for example, a speaker, a headphone, or the like, and outputs various sounds.

The shop terminal 4 is an information processing device installed in a shop which sets up a business in the virtual shopping mall, and used to register data on a product for sale in the virtual shopping mall in the database 15. For example, the shop terminal 4 is a tablet computer, a lap top computer, a desk top computer, or the like, and has a hardware configuration similar to that of the user terminal 20.

For example, in the server 10, a daemon program (for example, an HTTP daemon) is executed. Meanwhile, in the user terminal 20, a program (for example, a web browser) is activated, and a processing request (for example, an HTTP request) is sent to the server 10. In this case, a processing result (for example, an HTTP response) corresponding to the above described processing request is sent from the server 10 to the user terminal 20. For example, data written in a page description language is sent to the user terminal 20. Then, based on this data, a screen image based on the processing result is displayed on the display unit 25 of the user terminal 20. Similar processing is executed between the shop terminal 4 and the server 10.

In the following, a screen image that is displayed on the display unit 25 of the user terminal 20 when using the virtual shopping mall will be described. The screen image described below is displayed as a result of data communication between the user terminal 20 and the server 10.

Figure 2:
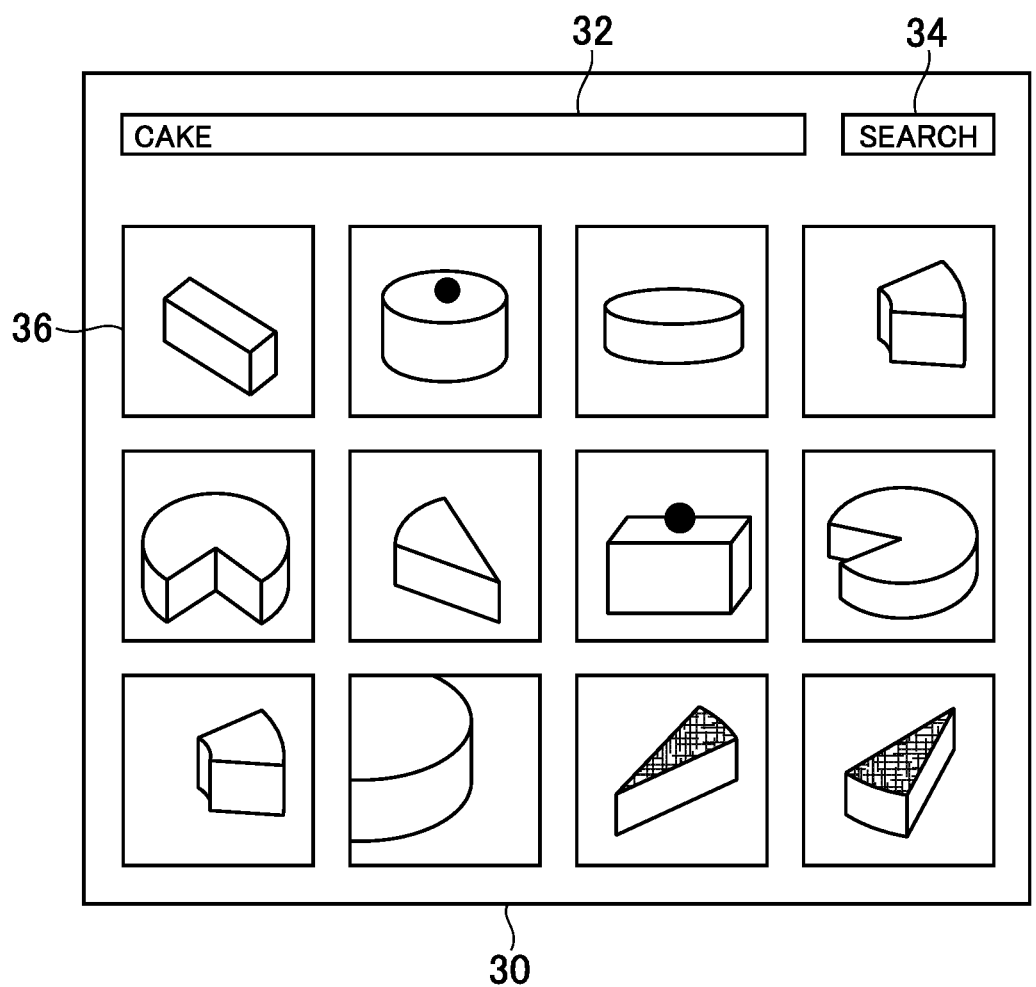
FIG. 2 shows one example of a list screen.

To use the virtual shopping mall, a user accesses the server 10, using the user terminal 20. For example, a user designates a keyword to search for a product to thereby look for a desired product. FIG. 2 shows one example of a list screen showing a list of products that satisfy a search condition.

The list screen 30 shown in FIG. 2 includes a keyword field 32 and a search button 34. A keyword for searching for a product is inputted in the keyword field 32. On the list screen 30 shown in FIG. 2, one keyword, namely, "cake", is inputted in the keyword field 32.

When the search button 34 is pressed down, search processing is executed and a list of products that satisfy the search condition is displayed on the list screen 30. For example, a list of products, whose title, category, or product page includes the keyword inputted in the keyword field 32, is displayed on the list screen 30. On the list screen 30 shown in FIG. 2, product images 36 are displayed in matrix as a list, while text information (for example, a title, a price, or the like) of the products is not displayed.

Alternatively, text information (for example, a title, a price, or the like) of a product as well may be displayed on the list screen 30.

The product image 36 is an image registered in advance by each shop. A shop may use an image provided by a manufacturer of a product as the product image 36. In the virtual shopping mall, same products may be sold in two or more shops, and the same or similar images are often used as the product image 36 of the same products. However, as the product image 36 is registered by each shop, there is a case in which the product images 36 of the same products are not the same or similar with each other. In addition, there is a case in which a character string, such as "free shipment" or the like is added to the product image 36.

Figure 3:
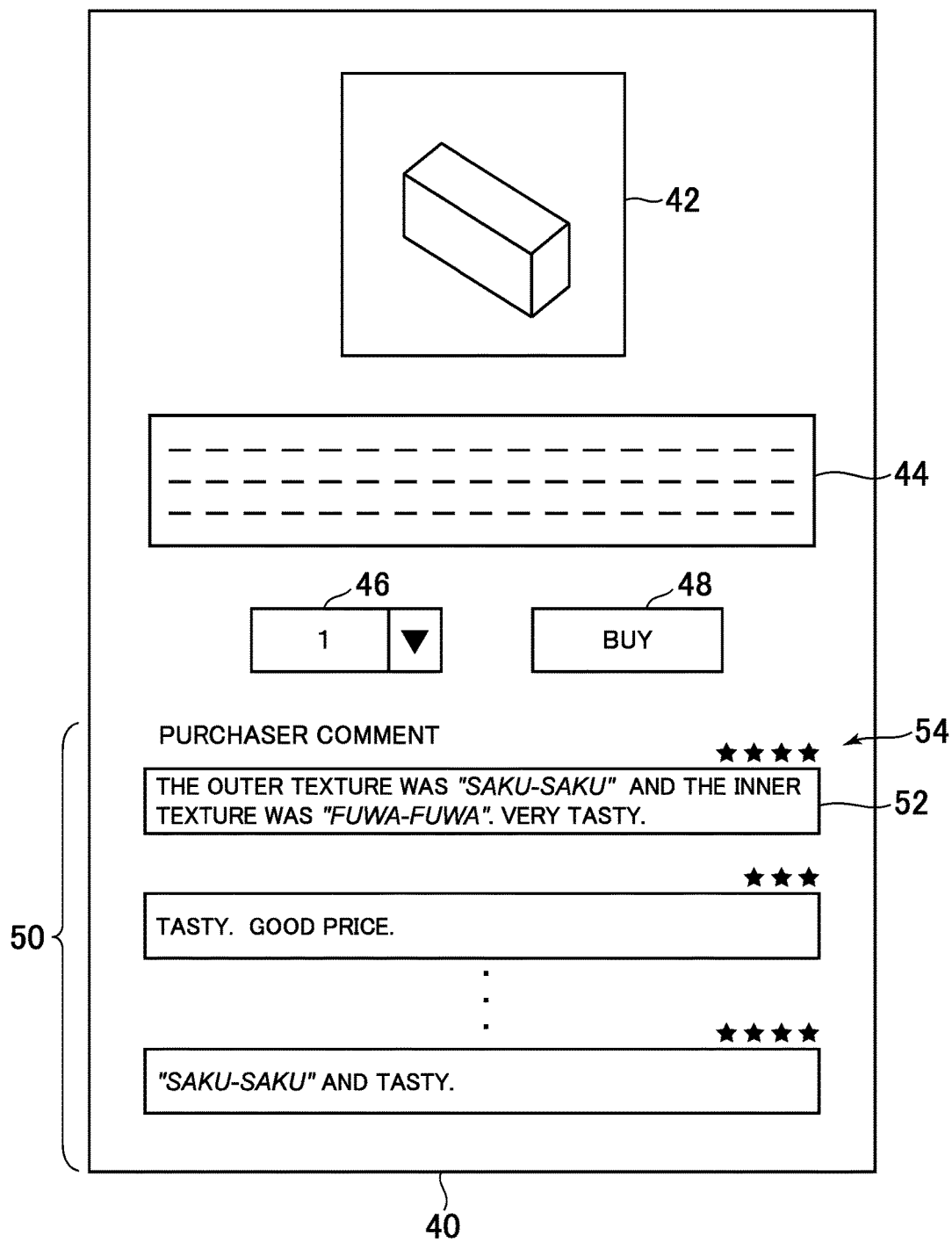
FIG. 3 shows one example of a product screen.

When a user selects any product image 36, a product screen relevant to that product image 36 is displayed on the display unit 25 of the user terminal 20. FIG. 3 shows one example of the product screen. As shown in FIG. 3, the product screen 40 includes a product image 42, a description 44, a selection field 46, and a buy button 48. The description 44 is a description about the product prepared by a shop. When a user selects the quantity of the product in the selection field 46 and presses down the buy button 48, product purchase processing is executed.

The product screen 40 further includes a comment field 50. In the electronic commerce system 1, a purchaser of a product can register a feedback on his/her experience of actually using the product (for example, use or eat/drink) as a comment. In addition, a purchaser of a product can register an evaluation on the product together with a comment.

A comment 52 registered by a purchaser of the product is displayed in the comment field 50. In addition, an evaluation mark 54 indicating an evaluation on the product is displayed in the comment field 50 so as to be associated with the comment 52. In the example shown in FIG. 3, the evaluation mark 54 includes one or more star marks, and more star marks indicate higher evaluation on the product by a purchaser.

Referring to the comment field 50, a user can determine whether or not to buy the product. Note that the comment field 50 may be prepared on a screen different from the product screen 40 and a link to that screen may be included in the product screen 40.

Note that a purchaser of a product may use onomatopoeia to convey what they have felt in their experience of actually using the product (in other words, a characteristic of the product which they found out by actually using the product) to others. Thus, a comment registered by a purchaser of a product may include onomatopoeia.

Note here that "onomatopoeia" refers to "onomatopoeia" in a broad sense, and includes a mimetic word and an onomatopoeic word, for example. A "mimetic word" refers to a word that sensuously expresses a state, condition, or the like of an object, while an "onomatopoeic word" refers to a word that expresses actual sound, using a character. In the example shown in FIG. 3, "saku-saku" (crispy) "fuwa-fuwa" (fluffy) are examples of onomatopoeia. Onomatopoeia plainly expresses a characteristic of a product learned only by those having actually used the product.

For example, from an onomatopoeia included in the comment 52, a user can realize a characteristic of a product which can be felt by actually experiencing the product (in other words, a characteristic of a product which cannot be known without actually experiencing the product). Such a characteristic of a product will be hereinafter referred to as a "sensuous characteristic of a product".

Figure 4:
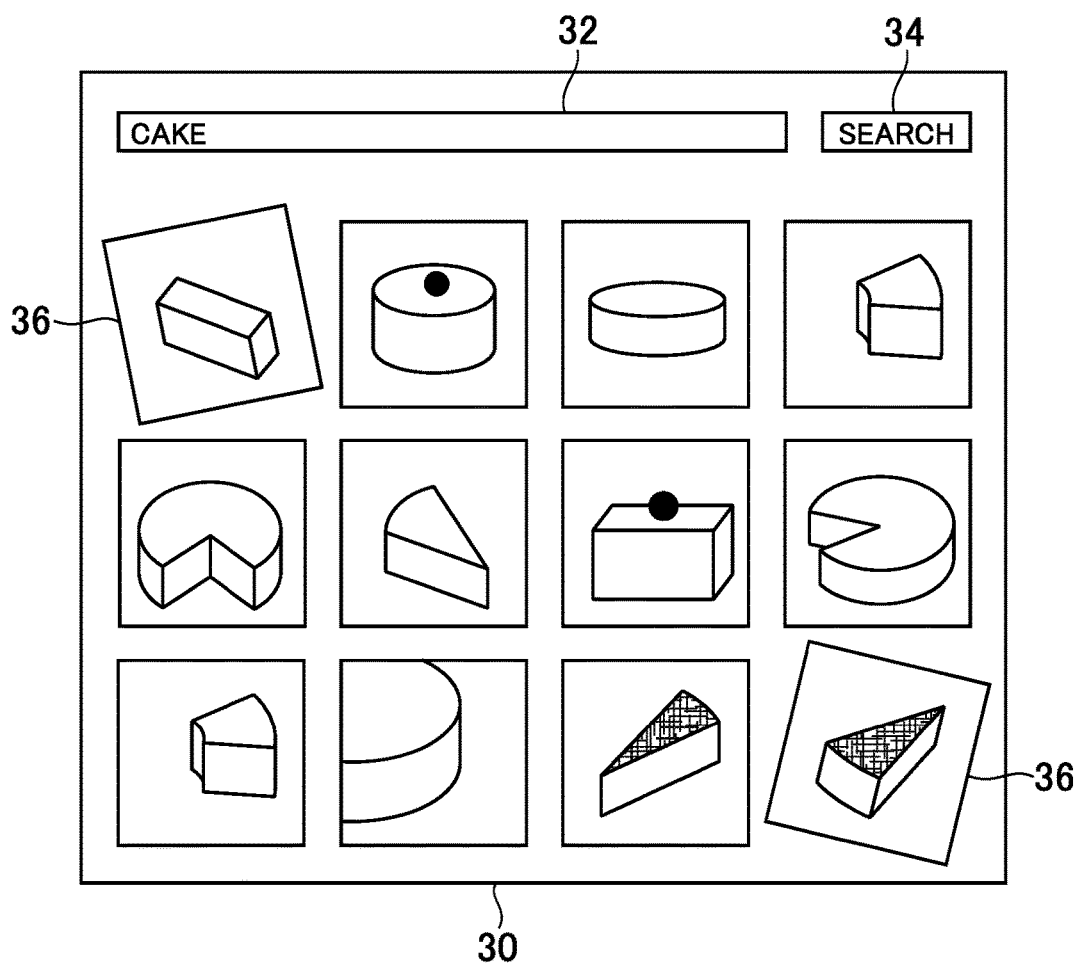
Figures 5, 6:
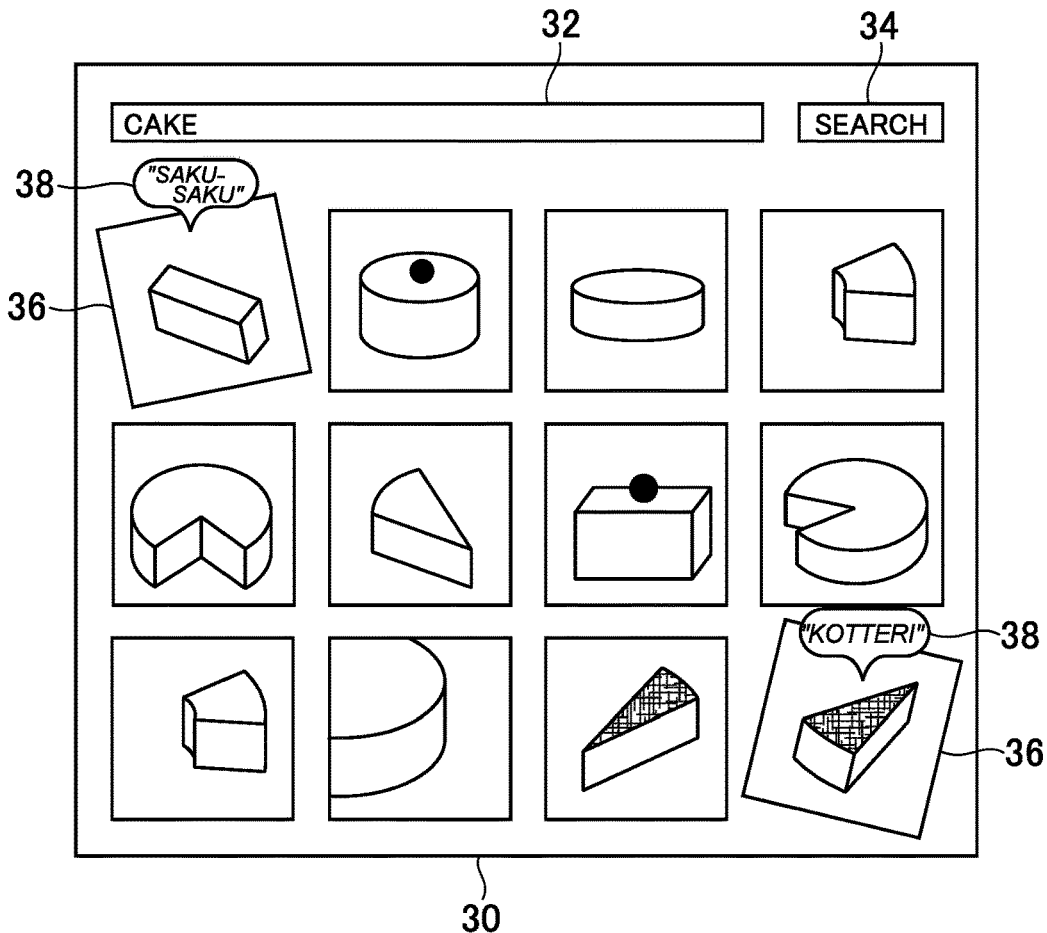

Note here that there is a case in which, on the list screen 30, a user wishes to know a characteristic of a product as compared with other products. However, it may be difficult for a user to figure out such a characteristic from the product image 36. That is, although a user can realize an external feature of a product by seeing the product image 36, there is a case that it is difficult to know other characteristics (for example, a sensuous characteristic of the product) from the product image 36. Regarding this point, the electronic commerce system 1 has a function for assisting a user seeing the list screen 30 to know a characteristic of a product as compared with other products. FIGS. 4 and 5 are diagrams explaining this function.

Initially, at least one product image 36 is selected from among the product images 36 displayed on the list screen 30.

Then, as shown in FIG. 4, the selected product image 36 is tilted to the left or right. Thereafter, as shown in FIG. 5, a balloon 38 is displayed so as to be associated with the tilted product image 36. In the balloon 38, characteristic information describing a characteristic of the product as compared with other products is displayed. For example, a term indicating a characteristic of the product that is not possessed by other products (hereinafter referred to as a "characteristic term") is displayed. Specifically, an onomatopoeia included in the comment information of the product and not included in the comment information of other products is displayed as a characteristic term.

Assume here a case in which the product images 36 of products P1 to P12 are displayed on the list screen 30. That is, on the list screen 30, assume that the product images 36 of the products P1 to P4 are displayed in the uppermost row from left to right. Similarly, assume that the product images 36 of the products P5 to P8 are displayed in the middle row from left to right, and the product images 36 of the products P9 to P12 are displayed in the lowermost row from left to right.

Moreover, assume here that onomatopoeias such as are shown in FIG. 6 are included in the comment information of the products P1 to P12. Although many onomatopoeias are actually included in the comment information of the products P1 to P12, these are omitted in FIG. 6 for convenience. In FIG. 6, the "number of appearances" refers to the number of times which the onomatopoeia appears in the comment information of the product. In other words, the "number of appearances" refers to the number of times which the onomatopoeia is used in the comment information of the product. In the example shown in FIG. 6, for example, "saku-saku" (crispy) is included in the comment information of the product P1, and it is indicated that "saku-saku" (crispy) is used ten times in the comment information of the product P1.

In the example shown in FIG. 6, "saku-saku" (crispy) and "fuwa-fuwa" (fluffy) are included in the comment information of the product P1. Among these, "fuwa-fuwa" (fluffy) is included in the comment information of the products P3, P5 as well, while "saku-saku" (crispy) is not included in the comment information of products other than the product P1. In this case, "saku-saku" (crispy) describes a characteristic unique to the product P1, not possessed by the other products. Thus, "saku-saku" (crispy) is specified as a characteristic term of the product P1, and is displayed on the list screen 30 so as to be associated with the product image 36 of the product P1.

In the example shown in FIG. 6, "kotteri" (thick) is included in the comment information of the product P12, and not included in the comment information of the other products. In this case, "kotteri" (thick) describes a characteristic unique to the product P12, not possessed by the other products. Thus, in this case, "kotteri" (thick) is specified as a characteristic term of the product P12, and is displayed on the list screen 30 so as to be associated with the product image 36 of the product P12.

Note that in the example shown in FIG. 6, "fuwa-fuwa" (fluffy) is included in the comment information of the product P3, and it is also included in the comment information of the products P1 and P5. Thus, "fuwa-fuwa" (fluffy) is not considered as showing a characteristic unique to the product P3, not possessed by the other products displayed on the list screen 30. Thus, on the list screen 30, "fuwa-fuwa" (fluffy) is not displayed so as to be associated with the product image 36 of the product P3. For the same reason, "fuwa-fuwa" (fluffy) is not displayed so as to be associated with the product images of the products P1, P5.

After elapse of a predetermined period of time after the balloon 38 is displayed, the balloon 38 is erased, and the tilted product image 36 returns to its original state (an upright state). In the above described manner, the balloon 38 including a characteristic term is displayed on the list screen 30. From a user's point of view, it appears as if the product images 36 are appealing their own characteristics one after another.

On the list screen 30 shown in FIG. 5, the balloon 38 is not displayed over the other product images 36. However, it will not be particularly problematic to display the balloon 38 over the other product image S36 as the balloon 38 disappears after elapse of a predetermined period of time.

Further, in the case where the list screen 30 can be scrolled, the balloon 38, which is relevant to the product image 36 that is actually displayed on the display unit 25, is displayed. Note that it is preferable that the balloon 38 is stopped from being displayed while a user is scrolling the list screen 30.

According to the electronic commerce system 1, a user can figure out a characteristic of a product as compared with other products, by referring to the characteristic term in the balloon 38. That is, from the balloon 38, a user can figure out the above described characteristic of a product that can be hardly comprehended from the product image 36.

Moreover, in the electronic commerce system 1, the balloon 38 is displayed so as to be associated with the product image 36 after the product image 36 is tilted to the left or right. This makes it possible to attract a user's attention to the product image 36 in association with which the balloon 38 is displayed. Thus, it is possible to encourage a user to see the characteristic term in the balloon 38.

Figures 7, 8, 9:
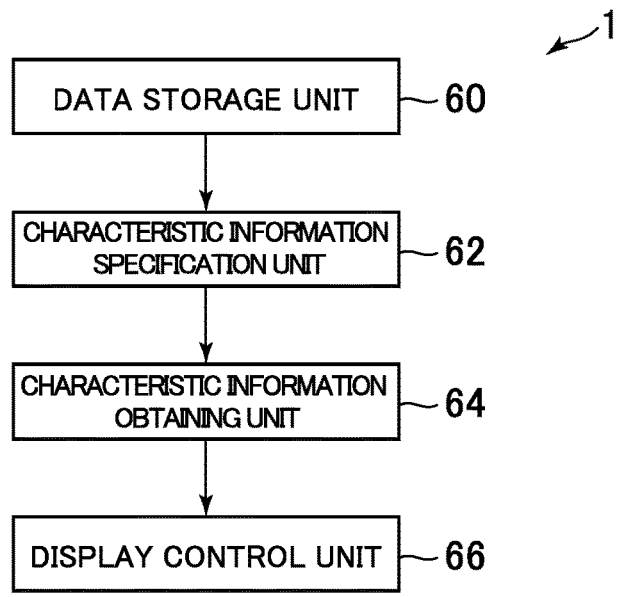
FIG. 7 is a functional block diagram showing one example of functions implemented in an electronic commerce system.
FIG. 8 shows one example of a user information table.
FIG. 9 shows one example of a shop information table.

In the following, a configuration for implementing the above described functions will be described. FIG. 7 is a functional block diagram showing function blocks implemented in the electronic commerce system 1. As shown in FIG. 7, the electronic commerce system 1 includes a data storage unit 60, a characteristic information specification unit 62 (characteristic information specification means), a characteristic information obtaining unit (characteristic information obtaining means), and a display control unit 66 (display control means).

Initially, the data storage unit 60 will be described. The data storage unit 60 is implemented using the database 15 (a storage device), for example. The data storage unit 60 may be implemented using a plurality of databases (a plurality of storage devices). That is, data described here as being stored in the data storage unit 60 may be stored dispersed among a plurality of databases (a plurality of storage devices).

Various kinds of data are stored in the data storage unit 60. FIGS. 8 to 14 show one example of data stored in the data storage unit 60.

FIG. 8 shows one example of a user information table. A user information table shows information on a user who uses the virtual shopping mall. The user information table shown in FIG. 8 includes "user ID", "user name", "address", and "mail address" fields. Note that the "user ID" field shows identification information for uniquely identifying a user.

FIG. 9 shows one example of a shop information table. A shop information table shows information on a shop that is open in the virtual shopping mall. The shop information table shown in FIG. 9 includes "shop ID", "shop name", and "mail address" fields. Note that the "shop ID" field shows identification information for uniquely identifying a shop.

FIG. 10 shows one example of a product basic information table. A product basic information table shows basic information on a product. The product basic information table shown in FIG. 10 includes "unique product ID", "title", and "category" fields. The "unique product ID" field shows identification information unique to a product. The same unique product IDs are given to the same products. The "title" field shows the title (the name) of the product, and the "category" field shows the category to which the product belongs.

FIG. 11 shows one example of a product information table. A product information table shows information on a product that is sold at each shop. The product information table shown in FIG. 11 includes "product ID", "shop ID", "unique product ID", "price", "product image", and "product page" fields.

The "product ID" field shows identification information for uniquely identifying a product that is sold at each shop. Different product IDs are given to the same products, if the same products are sold at different shops. In this specification, a product having the product ID "P1" is referred to as "product P1".

The "shop ID" field shows the shop ID of a shop that sells the product. The "unique product ID" field shows the unique product ID of the product that is sold at the shop. The "price" field shows the sale price of the product registered by the shop. The "product image" field shows link information (for example, a file name, a storing location, and the like) to a product image registered by the shop. The "product page" field shows link information to a product page registered by the shop.

Figures 12, 13, 14:
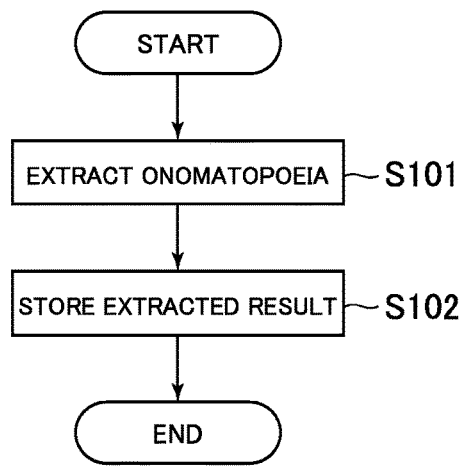
FIG. 12 shows one example of a trade history information table.
FIG. 13 shows one example of a comment information table.
FIG. 14 shows one example of processing executed in an electronic commerce system.

FIG. 12 shows one example of a trade history information table. A trade history information table shows a history of trades that have been made in the virtual shopping mall. The trade history information table shown in FIG. 12 includes "trade ID", "time and date", "shop", "purchaser", "product", and "price" fields. The "trade ID" field shows identification information for uniquely identifying a trade. The "time and date" field shows the time and date when the trade is made. The "shop" field shows the shop that has sold the product. The "purchaser" field shows the user who has bought the product. The "product" field shows the product which the user has bought. The "price" field shows the price which the user has paid.

FIG. 13 shows one example of a comment information table. A comment information table shows information on a comment registered by a purchaser of a product. The comment information table shown in FIG. 13 includes "comment ID", "registrant", "product", "comment", and "evaluation result" fields. The "comment ID" field shows identification information for uniquely identifying a comment. The "registrant" field shows the user who has registered the comment. The "product" field shows the product on which the comment has been made. The "comment" field shows the comment registered by the user. The "evaluation result" field shows the result of the evaluation of the product made by the user. For example, an evaluation point given in five levels (for example, one to five points) is registered in the "evaluation result" field. The higher the evaluation point is, the higher the evaluation is. Note that the comment and evaluation result registered by the user are made associated with a product image via the product ID (see FIGS. 11 to 13).

The characteristic information specification unit 62 will be described. The characteristic information specification unit 62 is implemented using the user terminal 20, for example. Alternatively, the characteristic information specification unit 62 may be implemented using the server 10 instead.

Based on the information concerning the object of one image from among the plurality of images and being associated with the one image and information concerning the objects of the other images from among the plurality of images and being associated with the other images, the characteristic information specification unit 62 specifies characteristic information of the object of the one image as compared with the objects of the other images.

Based on the information associated with the one image and the information associated with the other images, the characteristic information specification unit 62 specifies relative characteristic information of the object of the one image regarding the objects of the other images. That is, the characteristic information specification unit 62 specifies characteristic information unique to the object of the one image, not possessed by the objects of the other images.

For example, the information associated with the one image includes text information concerning the object of the one image, and the information associated with the other images includes text information concerning the objects of the other images. Then, the characteristic information specification unit 62 specifies a term included in the text information associated with the one image and not included in the text information associated with the other images as "relative characteristic information of the object of the one image regarding the objects of the other images".

For example, in the example shown in FIGS. 2 to 6, the plurality of product images 36 displayed on the list screen 30 correspond to one example of the "plurality of images", and a product corresponds to one example of "the object of an image". Further, the comment information of the product corresponds to one example of "information concerning the object" and "text information concerning the object".

Thus, based on the comment information of the product (referred to as a "product X" here for convenience) and the comment information of the other products, the characteristic information specification unit 62 specifies characteristic information of the product X as compared with the other products. For example, the characteristic information specification unit 62 specifies relative characteristic information of the product X regarding the other products. That is, the characteristic information specification unit 62 specifies characteristic information unique to the product X not possessed by the other products.

For example, the characteristic information specification unit 62 extracts a term (a characteristic term) included in the comment information of the product X and not included in the comment information of the other products. Specifically, the characteristic information specification unit 62 extracts an onomatopoeia included in the comment information of the product X and not included in the comment information of the other products as a characteristic term.

Below, an example of a determination method for determining whether or not an onomatopoeia is included in comment information will be described. For example, whether or not an onomatopoeia is included in comment information is determined based on a common characteristic of onomatopoeia.

For example, in the case of Japanese, there are many onomatopoeias including a character string repeated twice (for example, "fuwa-fuwa" (fluffy), "pasa-pasa" (dry), and the like). Thus, determination as to whether or not a word having this characteristic is included in text information leads to determination as to whether or not an onomatopoeia is included in the text information. More specifically, a pattern such as, for example, "ABAB" is determined in advance and a character string fitting into such a pattern is extracted as an onomatopoeia. In the above, each of "A" and "B" represents one unique hiragana or katakana character.

Further, in the case of Japanese, for example, an onomatopoeia often includes a specific character. For example, a small-written letter of Japanese (used for palatalized sound or assimilated sound) is often included in an onomatopoeia (for example, "shittori" (moist), "zusshiri" (heavy), and the like). Thus, determination as to whether or not a word having this characteristic is included in text information leads to determination as to whether or not an onomatopoeia is included in the text information. More specifically, a pattern, such as "A tt (or ss, etc) B ri", for example, is determined in advance, and a character string fitting into this pattern is extracted as an onomatopoeia. In the above, each of "A" and "B" uniquely represents one hiragana or katakana character. Note here that "tt (or ss, etc)" corresponds to just one small-written Japanese letter, which is used for expressing a palatalized sound or an assimilated sound. "tt (or ss, etc)" and "ri" are both written with one letter in Japanese, and they both may be either of hiragana or katakana.

Meanwhile, according to the above described determination method, however, there is a possibility that a word that is not an onomatopoeia is erroneously determined as an onomatopoeia. To address the above, a list of words which are not onomatopoeias but could be erroneously determined as an onomatopoeias (a stop word list) may be stored in the data storage unit 60 so that a word registered in the stop word list is not determined as an onomatopoeia.

Further, in Japanese, the same onomatopoeias may be written in different kinds of characters (hiragana or katakana). To address the above, onomatopoeias different only in the kind of characters in which the onomatopoeias are written may be considered as the same onomatopoeias.

Note that a determination method for determining whether or not an onomatopoeia is included in comment information is not limited to the above described example. For example, the above described determination may be made based on list data including a list of onomatopoeias (in other words, dictionary data of onomatopoeias). That is, it may be determined whether or not an onomatopoeia registered in the list data is included in text information.

Note that also the title of a product possibly corresponds to one example of the "information concerning the object" and "text information concerning the object". Thus, the characteristic information specification unit 62 may take an onomatopoeia that the title of the product includes into consideration. Further, a sentence included in a product page (for example, a product description) as well possibly corresponds to one example of the "information concerning the object" and "text information concerning the object". That is, the characteristic information specification unit 62 may take an onomatopoeia that a sentence in a product page (for example, a product description) includes into consideration.

The characteristic information obtaining unit 64 and the display control unit 66 will be described. The characteristic information obtaining unit 64 and the display control unit 66 are implemented using the user terminal 20, for example. Alternatively, the characteristic information obtaining unit 64 and the display control unit 66 may be implemented using the server 10 instead.

The characteristic information obtaining unit 64 obtains the characteristic information specified by the characteristic information specification unit 62. The display control unit 66 displays a screen image including a plurality of images on a display unit. Further, the display control unit 66 displays the characteristic information obtained by the characteristic information obtaining unit 64 so as to be associated with an image.

For example, the display control unit 66 displays a screen image for having a user to select at least one of the plurality of images (hereinafter referred to as a "first screen") on the display unit. Further, the display control unit 66 sets at least one of the plurality of images displayed on the first screen as a subject of which a characteristic is displayed, and displays the characteristic information obtained by the characteristic information obtaining unit 64 so as to be associated with the image set as the subject as characteristic information associated with the image. The display control unit 66 sequentially changes the above described subject among the plurality of images displayed on the first screen.

Further, for example, the display control unit 66 displays, on the display unit, a screen image (hereinafter referred to as a "second screen") for presenting to a user all or a part of the information associated with the image selected by the user from among the plurality of images displayed on the first screen. For example, while information associated with an image includes a plurality of individual information items, at least one of the plurality of individual information items associated with the image selected by the user is displayed on the second screen.

In the example shown in FIGS. 2 to 6, for example, the display unit 25 of the user terminal 20 corresponds to one example of the "display unit". The list screen 30 corresponds to one example of the "first screen". The product screen 40 corresponds to one example of the "second screen". An individual comment on a product corresponds to one example of the "individual information".

For example, as to each of the product images 36 displayed on the list screen 30, the display control unit 66 determines whether or not to select the product image 36 as a subject of which a characteristic is displayed, based on predetermined probability information (for example, 20 percent). Then, the display control unit 66 displays characteristic information (the balloon 38) so as to be associated with the product image 36 selected as the subject of which a characteristic is displayed, and after elapse of a predetermined period of time (for example, two to three seconds), erases the characteristic information (the balloon 38) from the list screen 30. The display control unit 66 repetitively executes this processing for every predetermined period of time (for example, five seconds).

Further, for example, the display control unit 66 executes processing for attracting a user's attention to the product image 36 displayed on the list screen 30, and displays the characteristic information so as to be associated with the product image 36 during or after the processing.

For example, in the example shown in FIGS. 2 to 6, processing for tilting the product image 36 to the left or right corresponds to one example of the "processing for attracting a user's attention to the image". In the example shown in FIGS. 2 to 6, for example, the display control unit 66 tilts the product image 36 to the left or right, and thereafter displays the characteristic information so as to be associated with the tilted product image 36 (see FIGS. 4 and 5).

To "display characteristic information so as to be associated with the product image 36" means, for example, to display characteristic information in a manner that a user can realize at a glance that the characteristic information is associated with the product image 36. For example, to display characteristic information as described below corresponds to one example of to output characteristic information so as to be associated with the product image 36":
(a) to display characteristic information so that it is at least partially overlaid on the product image 36;
(b) to display characteristic information around (near) the product image 36;
(c) to display characteristic information at a position determined based on the display position of the product image 36; and
(d) to display a line, an image, or the like that indicates association between the characteristic information and the product image 36 together with the characteristic information.

For example, as shown in FIG. 5, the display control unit 66 displays the balloon 38 including the characteristic information so that the balloon 38 is at least partially overlaid on the product image 36. For example, the display control unit 66 displays the balloon 38 such that the tail of the balloon 38 (the leg of the balloon) is overlaid on the product image 36.

Alternatively, the display control unit 66 may display the balloon 38 so that the balloon 38 is not overlaid on the product image 36, instead. The display control unit 66 may display the balloon 38 such that the tail of the balloon 38 points toward the product image 36. That is, the display control unit 66 may display the balloon 38 such that the tail of the balloon 38 is directed from the main part of the balloon 38 toward the product image 36.

"Processing for attracting a user's attention to the image" is not limited to the processing of tilting an image. For example, processing for having an image outstand more than other images corresponds to the "processing for attracting a user's attention to the image". For example, processing such as shown below possibly corresponds to one example of the "processing for attracting a user's attention to the image":
(a) processing for displaying an image in a manner different from that of other images (for example, processing for blinking an image, processing for decorating a periphery of an image, processing for expanding or reducing an image in size, or the like); and
(b) processing for moving an image (for example, processing of swinging an image between left and right, or the like).

For example, the display control unit 66 may keep blinking the product image 36 for one or two seconds, and thereafter display the balloon 38 so as to be associated with the product image 36. Further, for example, the display control unit 66 may display the balloon 38 so as to be associated with the product image 36 while swinging the product image 36 between left and right. Alternatively, the display control unit 66 may blink or swing the product image 36 while displaying the balloon 38 so as to be associated with the product image 36. This makes it easier for a user to know the balloon 38 of which product image 36 is to be or being displayed.

Note that the display control unit 66 may execute processing for attracting a user's attention to the product image 36 after the balloon 38 displayed so as to be associated with the product image 36 disappears. This makes it possible for a user to realize the balloon 38 of which product image 36 has disappeared. Note that in the case where a user points towards the product image 36, using a pointing device, after the balloon 38 has disappeared, the balloon 38 may be displayed again.

In the following, processing for implementing the above described function blocks will be described.

FIG. 14 shows one example of processing for extracting an onomatopoeia. For example, the processing shown in FIG. 14 is executed when a comment on a product is newly registered by a purchaser. In the following, a case in which a comment on the product P1 is newly registered is assumed.

As shown in FIG. 14, with reference to the comment information table, the control unit 11 of the server 10 firstly extracts an onomatopoeia from the comment information registered so as to be associated with the product P1 (S101). Specifically, as described above, the control unit 11 extracts an onomatopoeia, based on a characteristic common to onomatopoeias. Alternatively, the control unit 11 extracts an onomatopoeia, based on the list data of onomatopoeias.

After execution of step S101, the control unit 11 stores the result of onomatopoeia extraction in the database 15 (S102). For example, an extracted result table such as is shown in FIG. 6 is stored in the database 15.

The control unit 11 may execute the processing shown in FIG. 14 at a predetermined time and date. For example, at a predetermined time every day, the control unit 11 may execute the processing shown in FIG. 14 with respect to a product for which a comment is newly registered on that day.

Figure 15:
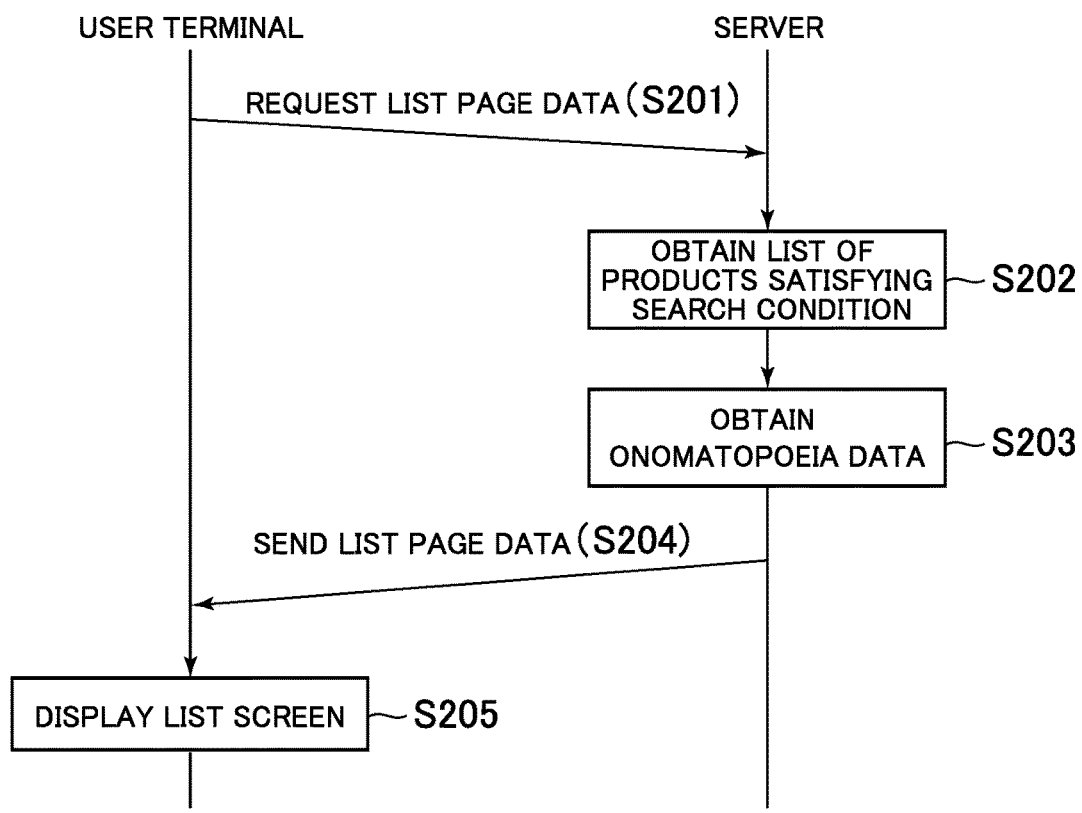
FIG. 15 shows another example of processing executed in an electronic commerce system.

FIG. 15 shows one example of processing that is executed when the search button 34 on the list screen 30 is pressed down. For example, the control unit 21 of the user terminal 20 executes the processing shown in FIG. 15 according to a program to thereby function as the display control unit 66.

As shown in FIG. 15, when the search button 34 is pressed down, the control unit 21 of the user terminal 20 requests list page data to the server 10 (S201). That is, the control unit 21 sends a search condition designated by a user (the keyword inputted in the keyword field 32) to the server 10 to thereby request the server 10 to send list page data showing a list of products that satisfy the search condition.

When the above described request is received by the server 10, the control unit 11 of the server 10 accesses the database 15 to thereby obtain the list of products that satisfy the search condition (S202).

Thereafter, the control unit 11 accesses the extracted result table to obtain onomatopoeia data of each product included in the product list obtained at step S202 (S203). Note that the onomatopoeia data of a product shows an onomatopoeia extracted from the comment information of the product (in other words, an onomatopoeia included in the comment information of the product).

Thereafter, the control unit 11 sends the list page data showing the product list obtained at step S202 to the user terminal 20 (S204). For example, in the list page data, a script program is embedded. The script program is for executing processing for displaying the balloon 38 (see FIG. 16 to be described later), based on the link information of the product image of each product obtained at step S203, the onomatopoeia data on each product obtained at step S203, and the onomatopoeia data of each product.

The control unit 21 (the display control unit 66) of the user terminal 20 receives the list page data, and displays the list screen 30 on the display unit 25 (S205).

FIG. 16 shows one example of processing that is executed in the user terminal 20 while the list screen 30 is displayed. For example, the processing shown in FIG. 16 is executed based on the script program included in the list page data received at step S204 in FIG. 15. The control unit 21 of the user terminal 20 executes the processing shown in FIG. 16 according to a program to thereby function as the characteristic information specification unit 62, the characteristic information obtaining unit 64, and the display control unit 66.

It is preferable that the processing shown in FIG. 16 is executed after elapse of a predetermined period of time (for example, three seconds) after the list screen 30 is displayed. This is because it could puzzle a user to display the balloon 38 at the same time when the list screen 30 is displayed.

As shown in FIG. 16, initially, the control unit 21 selects a product image 36 to be a subject with which a balloon is associated, from among the product images 36 displayed on the list screen 30 (S301). That is, the control unit 21 selects a product image 36 to be a subject of the processing described later (steps S302 to S306).

For example, the control unit 21 selects at random at least one of the product images 36 displayed on the list screen 30 as the above described subject. For example, as to each of the product images 36 displayed on the list screen 30, the control unit 21 determines whether or not to select the product image 36 as the above described subject, based on predetermined probability information. The probability information in this case is set such that the probability of being selected as the above described subject becomes a predetermined probability (for example, twenty percent).

It is preferable that the control unit 21 does not select the product image 36 of a product having no onomatopoeia (that is, the product image 36 of a product from which no onomatopoeia has been extracted) as the processing subject with reference to the onomatopoeia data of each product embedded in the list page data. Alternatively, in order to avoid selection of many product images 36 as the above described subject, the upper limit number (for example, five) of the product images 36 which can be selected as the above described subject may be set.

After execution of step S301, the control unit 21 (the characteristic information specification unit 62 and the characteristic information obtaining unit 64) obtains a characteristic term (characteristic information) to be displayed so as to be associated with the product image 36 selected at step S301 (S302).

For example, when the product image 36 selected at step S301 is the product image 36 of the product P1, the control unit 21 obtains an onomatopoeia included in the onomatopoeia data of the product P1 and not included in the onomatopoeia data of the other products, based on the onomatopoeia data of each product embedded in the list page data. This onomatopoeia is obtained as a characteristic term to be displayed so as to be associated with the product image 36 of the product P1.

In the case where a plurality of onomatopoeias are included in the onomatopoeia data of the product P1, the control unit 21 selects any of these plurality of onomatopoeias. For example, the control unit 21 selects an onomatopoeia that appears the largest number of times. Alternatively, the control unit 21 may select any of the plurality of onomatopoeias, based on the probability information. The probability information in this case may be set such that the probability with which an onomatopoeia of the more frequent appearances is selected is higher than that with which an onomatopoeia with of the less frequent appearances is selected.

After execution of step S302, the control unit 21 (the display control unit 66) tilts the product image 36 selected at step S301 to the left or right (S303). Thereafter, the control unit 21 (the display control unit 66) displays the balloon 38 including the characteristic term obtained at step S302 so as to be associated with the product image 36 tilted at step S303 (S304).

After execution of step S304, the control unit 21 monitors whether or not a reference display time has elapsed after the balloon 38 was displayed (S305). Here, the "reference display time" is set to a period of time (for example, around one to five seconds) which allows a user a sufficient visual recognition of the characteristic term in the balloon 38.

When it is determined that the reference display time has elapsed, the control unit 21 erases the balloon 38 displayed at step S304 from the list screen 30 to return the product image 36 tilted at step S303 to its original state (the upright state) (S306).

Thereafter, the control unit 21 executes the processing shown in FIG. 16 again from the beginning. In this case, a new balloon 38 is displayed after the balloon 38 displayed on the list screen 30 disappears. But alternatively, the new balloon 38 may be displayed immediately before the balloon 38 disappears.

Note that it may be configured such that the onomatopoeia data of each product is not included in the list page data at step S204 in FIG. 15. Then, at step S302 in FIG. 16, the control unit 21 may request the server 10 to send a characteristic term to be displayed so as to be associated with the product image 36 selected at step S301. In this case, processing similar to the processing described above as being executed by the control unit 21 at step S302 is executed by the control unit 11 (the characteristic information specification unit 62) of the server 10, and the characteristic term is sent from the server 10 to the user terminal 20. Then, the control unit 21 (the characteristic information obtaining unit 64) obtains the characteristic term sent from the server 10. Note that the characteristic term sent from the server 10 is cached in the user terminal 20.

Further, note that a characteristic term of each product included in the product list obtained at step S202 may be extracted at step S203 in FIG. 15. That is, processing similar to the processing described above as being executed at step S302 in FIG. 16 may be executed at step S203 to extract a characteristic term of each product. In this case, the characteristic term of each product extracted at step S203 is embedded in the list page data at step S204, and the characteristic term of the product embedded in the list page data is obtained at step S302. In this case, as extraction of a characteristic term of a product is executed by the control unit 11 of the server 10, the characteristic information specification unit 62 is implemented by the control unit 11 of the server 10.

In this embodiment, although processing for extracting an onomatopoeia (FIG. 14) is executed separately from the processing shown in FIG. 15, onomatopoeia extraction processing may be executed in the processing shown in FIG. 15. For example, onomatopoeia extraction processing may be executed at step S203 in FIG. 15.

Alternatively, onomatopoeia extraction processing (FIG. 14) may be executed in the processing shown in FIG. 16. For example, the comment information of each product included in the product list obtained at step S202 may be embedded in the list page data at step S204 in FIG. 15, and onomatopoeia extraction processing and characteristic term extraction processing may be executed at step S302 in FIG. 16.

In the list screen 30 of the electronic commerce system 1 described above, characteristic information of a product (referred to as a "product X" here for convenience) as compared with other products is displayed so as to be associated with the product image 36 of the product X. For example, a characteristic term describing a characteristic unique to the product X not possessed by other products is displayed. According to the electronic commerce system 1, it is possible for a user viewing the list screen 30 to know a characteristic of the product X as compared with other products. That is, a user can see the above described characteristic of the product X which is difficult to know from the product image 36. That is, according to the electronic commerce system 1, it is possible to provide useful information to a user who selects at least one of the plurality of product images 36 displayed on the list screen 30.

Further, according to the electronic commerce system 1, characteristic information is displayed so as to be associated with the product image 36 after the product image 36 is tilted to the left and right. According to the electronic commerce system 1, it is possible to attract a user's attention to the product image 36 displayed so as to be associated with the characteristic information, and thus it is possible to encourage the user to see the characteristic information.

Note that the present invention is not limited to the above described embodiment.

[1] For example, even in the case where the same onomatopoeia (hereinafter referred to as an "onomatopoeia X" for convenience) is included in the comment information of a plurality of products, when the number of appearances of the onomatopoeia X in the comment information of one product (hereinafter referred to as a "product X" for convenience) is larger than those of the other products, the onomatopoeia X can be considered as describing a characteristic unique to the product X.

For example, in the example shown in FIG. 6, "fuwa-fuwa" (fluffy) is included in the comment information of the products P1, P3, P5. However, the number of its appearances in the comment information of the product P3 is larger than those of the other products P1, P5. Thus, "fuwa-fuwa" (fluffy) can be considered as describing a characteristic unique to the product P3. In this case, the characteristic information specification unit 62 may specify "fuwa-fuwa" (fluffy) as a characteristic term of the product P3.

That is, in the case where the number of appearances of the onomatopoeia X in the comment information of the product X is larger than those of other products, and the difference is greater than a threshold, the characteristic information specification unit 62 may specify the onomatopoeia X as a characteristic term of the product X.

[2] For example, the characteristic information specification unit 62 may specify characteristic information that is common to a product (referred to as a "product X" here for convenience) and other products which are same as or similar to the product X.

That is, the characteristic information specification unit 62 may specify characteristic information common to the product X and other products which are same as or similar to the product X, based on the information associated with the product image 36 of the product X and the information associated with other product images 36 showing the product which are same as or similar to the product X. For example, the characteristic information specification unit 62 may specify a term that satisfies all of the conditions a to c mentioned below as characteristic information common to the product X and the other products:
(a) included in the comment information of the product X;
(b) included in the comment information of a product which is same as or similar to the product X; and
(c) not included in the comment information of a product other than the above mentioned products.

Here again assume a case in which the product images 36 of the products P1 to P12 are displayed on the list screen 30. That is, on the list screen 30, the product images 36 of the products P1 to P4 are displayed in the uppermost row from left to right. Similarly, the product images 36 of the products P5 to P8 are displayed in the middle row from left to right, and the product images 36 of the products P9 to P12 are displayed in the lowermost row from left to right.

Moreover, here assume an onomatopoeia such as is shown in FIG. 17 is included in the comment information of the products P1 to P12. In actuality, many onomatopoeias are included in the comment information of the products P1 to P12, but these are not shown in FIG. 17 for convenience.

As shown in FIG. 11, as the unique product IDs of the products P11 and P12 are the same, the products P11 and P12 are the same products. Further, as shown in FIG. 17, "kotteri" (thick) is included in the comment information items of both of the products P11 and P12, but not included in the comment information of the other products displayed on the list screen 30. That is, "kotteri" (thick) satisfies all of the above described conditions a to c. Thus, "kotteri" (thick) describes a characteristic common to the products P11 and P12, and can be considered as describing a characteristic unique to the products P11 and P12.

Thus, the characteristic information specification unit 62 may specify "kotteri" (thick) as a characteristic term of the product P11, and the display control unit 66 may display "kotteri" (thick) so as to be associated with the product image 36 of the product P11. Similarly, the characteristic information specification unit 62 may specify "kotteri" (thick) as a characteristic term of the product P12, and the display control unit 66 may display "kotteri" (thick) so as to be associated with the product image 36 of the product P12.

Note that although an onomatopoeia included in common in the comment information items of the products having the same unique product IDs is specified as a characteristic term describing a characteristic unique to the products in the above, an onomatopoeia included in common in the comment information items of products having the same or similar titles, for example, may be specified as a characteristic term describing a characteristic unique to the products.

Alternatively, an onomatopoeia included in common in the comment information items of the products of which product images 36 are the same or similar may be specified as a characteristic term describing a characteristic unique to the products.

For example, as shown in FIG. 2, the product image 36 of the product P4 and the product image 36 of the product P9 are similar to each other. In this case, the products P4 and P9 may be considered as the same or similar products. As shown in FIG. 17, "fuwa-fuwa" (fluffy) is included in the comment information items of both of the products P4 and P9, but not included in the comment information of the other products displayed on the list screen 30. That is, "fuwa-fuwa" (fluffy) satisfies all of the above described conditions a to c. Thus, "fuwa-fuwa" (fluffy) describes a characteristic common to the products P4 and P9, and may be considered as describing a characteristic unique to the products P4 and P9.

That is, the characteristic information specification unit 62 may specify "fuwa-fuwa" (fluffy) as a characteristic term of the product P4, and the display control unit 66 may display "fuwa-fuwa" (fluffy) so as to be associated with the product image 36 of the product P4. Similarly, the characteristic information specification unit 62 may specify "fuwa-fuwa" (fluffy) as the characteristic information of the product P9, and the display control unit 66 may display "fuwa-fuwa" (fluffy) so as to be associated with the product image 36 of the product P9.

[2A] For example, when a user points to a product image 36 with which a characteristic term is associated (for example, in the case where a cursor is moved to the product image 36 with which a characteristic term is associated), other products associated with the characteristic term may be informed to the user.

In the example shown in FIG. 17, for example, as described above, "kotteri" (thick) is specified as a characteristic term describing a characteristic common to the products P11 and P12, and "kotteri" (thick) is displayed so as to be associated with the product image 36 of the product P11. When a user points to the product image 36 of the product P11 in this situation, the display control unit 66 may show the product P12 to the user as another product associated with "kotteri" (thick).

For example, the display control unit 66 may display the product image 36 of the product P12 in distinction from the other product images 36. For example, the display control unit 66 may display a predetermined character string or image so as to be associated only with the product image 36 of the product P12. Alternatively, the display control unit 66 may display the product image 36 of the product P12 in a display manner (for example, a display size, color, or the like) different from that of the other product images 36.

Further, for example, the display control unit 66 may display information (the product image 36) on the product P12 in a specific area separately prepared on the list screen 30.

In the above described manner, for example, when a user points to the product image 36 with which a characteristic term is associated, other products associated with the characteristic term are shown to the user. That is, it is possible to show other products, which the user is likely to be interested in, to the user.

[3] For example, information included in a search condition may be excluded from characteristic information of a product.

For example, in the case where "saku-saku" (crispy) is set as a search condition (a keyword), a list of products including "saku-saku" (crispy) in its title, category, product page, or the like, is displayed on the list screen 30. In this case, as the products displayed on the list screen 30 are all relevant to "saku-saku" (crispy), "saku-saku" (crispy) is not considered as showing a "characteristic unique to the product that is not possessed by other products". Thus, in such a case, it may be configured such that the characteristic information specification unit 62 does not specify "saku-saku" (crispy) as a characteristic term of the product. As described above, it may be configured such that the characteristic information specification unit 62 does not specify the term set as a search condition as a characteristic term of the product.

However, in the above described case, "saku-saku" (crispy) may be specified as a characteristic term, exceptionally for a product of which a number of appearances of "saku-saku" (crispy) is the largest among the products displayed on the list screen 30.

[4] For example, it may be configured such that only a comment (review) made by a user (a purchaser) who has highly evaluated the product is taken into consideration, and that made by a user who has lowly evaluated the product is not.

As described above, evaluation information, showing an evaluation given to the product (the object of the product image) by a user who has inputted the comment, is associated with the comment. Thus, the characteristic information specification unit 62 may use only a comment with which evaluation information satisfying a predetermined evaluation standard is associated, from among the comments associated with the product image to specify the characteristic information of the product. In other words, it may be configured such that, in specifying the characteristic information of a product, the characteristic information specification unit 62 does not use a comment associated with evaluation information not satisfying a predetermined evaluation standard, from among the comments associated with the product image.

As described above, as evaluation information associated with a comment is information showing an evaluation given to the product by a user who has inputted the comment, "a comment with which evaluation information satisfying a predetermined evaluation standard is associated" can be rephrased as a comment inputted by a user who has given an evaluation that satisfies a predetermined evaluation standard to the product.

A "predetermined evaluation standard" refers to a standard as to, for example, whether or not an evaluation point is equal to or greater than a threshold (for example, four points). In this case, a "comment with which a predetermined evaluation standard is associated" is a comment with which an evaluation point equal to or greater than the threshold is associated, and in other words, it is a comment inputted by a user who has given an evaluation point equal to or greater than the threshold to the product.

Alternatively, a "predetermined evaluation standard" may refer to, for example, a standard as to whether or not a rank of the comment sorted by the evaluation points in a descending order (from a higher evaluation point to a lower evaluation point) is equal to or higher than the $n^{th}$ (n: positive integer) rank. In this case, a "comment with which evaluation information satisfying a predetermined evaluation standard is associated" is a comment with which the first to $n^{th}$ highest evaluation point is associated, and in other words, it is a comment inputted by a user who has given the first to $n^{th}$ highest evaluation point to the product.

In the above described manner, only a comment, with which evaluation information satisfying a predetermined evaluation standard (that is, a comment inputted by a user who has given a high evaluation to the product) is associated, is taken into consideration, and a comment not satisfying a predetermined evaluation standard (that is, a comment inputted by a user who has given a low evaluation to the product) is not taken into consideration. A comment inputted by a user who has given a high evaluation to the product is likely to include a characteristic term that affirmatively describes a sensuous characteristic of the product (that is, a characteristic term describing a superior characteristic of the product). Meanwhile, a comment inputted by a user who has given a low evaluation to the product is likely to include a characteristic term that negatively describes a sensuous characteristic of the product. For a shop that sells the product, it is preferable that a characteristic term that affirmatively describes a sensuous characteristic of the product is displayed so as to be associated with the product image 36. Regarding this point, in the above described manner, it is possible to increase the possibility that a characteristic term that affirmatively describes a sensuous characteristic of a product is displayed so as to be associated with the product image 36.

[5] For example, when a subject with which a balloon is associated is switched between the product images 36 positioned far apart from each other, a position to which a user is to pay attention largely varies, which possibly makes the list screen 30 hard to see for a user. To address the above, it may be suppressed to switch a subject with which a balloon is associated between product images 36 separated to each other.

For example, when one product image 36 (referred to as a "product image X" here for convenience) is set as a subject with which a balloon is associated, the display control unit 66 may set at least one product image 36 displayed near (around) the product image X as a next subject with which a balloon is associated, subsequent to the product image X. For example, the display control unit 66 may set at least one of the product images 36 adjacent to the product image X as the subject with which a balloon is associated.

In the above described manner, it can be suppressed to switch the subject with which a balloon is associated between product images 36 positioned far apart from each other, which makes the list screen 30 easy to see for a user.

[6] For example, when a plurality of balloons 38 (characteristic information) are densely displayed on the list screen 30, it could become hard for a user to see the balloon 38. To address the above, it may be ensured that a plurality of balloons 38 are not densely displayed on the list screen 30.

For example, the display control unit 66 works such that at least a part of the time period during which the balloon 38 is displayed so as to be associated with one product image 36 (referred to as a "product image X" here for convenience) does not overlap at least a part of the time period during which the balloon 38 is displayed so as to be associated with a product image 36 having a predetermined positional relationship with the product image X.

Note that a "product image 36 having a predetermined positional relationship with the product image X" refers to a product image 36 displayed near (around) the product image X, for example. Alternatively, a "product image 36 having a predetermined positional relationship with the product image X" refers to a product image 36 displayed in a column or row where the product image X is displayed, for example.

In the above described manner, it is possible to ensure that a plurality of balloons 38 are not densely displayed, and thus to make it easier for a user to see the balloon 38.

[7] For example, a manner of displaying the characteristic information may be set for each of the characteristic information.

For example, the display control unit 66 may change the manner of displaying a characteristic term (referred to as a "characteristic term X" here for convenience) so as to be associated with one product image 36 (referred to as a "product image X" here for convenience), based on the information on the number of appearances of the characteristic term X in the comment information associated with the product image X. For example, the display control unit 66 may display a characteristic term X having a larger number of appearances in a more outstanding manner.

For example, the below corresponds to one example of to change the manner of displaying the characteristic term X":
(a) to change the display size, display color, or the like of the characteristic term X;
(b) to change the thickness, color, or the like of a line indicating an association between the characteristic term X and the product image X; and
(c) to change the size, shape, color, or the like of an image indicating an association between the characteristic term X and the product image X.

For example, the display control unit 66 sets the size of the balloon 38 displayed so as to be associated with the product image X (that is, the balloon 38 including the characteristic term X), based on the number of appearances of the characteristic term X in the comment information associated with the product image X.

Note that in order to set the size of the balloon 38 based on the number of appearances of the characteristic term X, correlation information indicating a correlation between the number of appearances of the characteristic term X and the size of the balloon 38 is necessary. The display control unit 66 sets the size of the balloon 38, based on such correlation information.

[7A] Note that on the list screen 30, a characteristic term to be displayed in a large size and a characteristic term to be displayed in a small size may be displayed together as a pair. A user may be, in the above described manner, led to pay attention first to the characteristic term displayed in a large size, and then to the characteristic term displayed in a small size.

For example, when two or more product images 36 from among the product images 36 displayed on the list screen 30 are set as subjects with which a balloon is associated, the display control unit 66 may set a pair of one product image 36 with a characteristic term to be displayed in a first display manner and another product image 36 with a characteristic term to be displayed in a second display manner that is more outstanding than the first display manner, as the subjects with which a balloon is associated.

For example, the display control unit 66 sets a pair of a product images 36 with a characteristic term to be displayed in a "small" size and another product image 36 with a characteristic term to be displayed in a "large" size as the subjects with which a balloon is associated. That is, the display control unit 66 selects one product image 36 from among product images 36 with a characteristic term to be displayed in a "small" size. Further, the display control unit 66 selects one product image 36 from among product images 36 with a characteristic term to be displayed in a "large" size. Then, the display control unit 66 sets the two product images 36 selected this way as the subjects with which a balloon is associated.

Note that "a product image 36 with a characteristic term to be displayed in the first display manner" refers to a product image 36, the number of appearances of whose characteristic term is in a first value range associated with the first display manner, and "a product image 36 with a characteristic term to be displayed in the second display manner" refers to a product image 36, the number of appearances of whose characteristic term is in a second value range associated with the second display manner.

In the above described manner, a characteristic term of the first display manner and a characteristic term of the second display manner that is more outstanding than the first display manner are both displayed on the list screen 30. For example, a characteristic term of a "small" size and a characteristic term of a "large" size are both displayed on the list screen 30. In the above described manner, a user initially pays attention to the characteristic term of the "large" size and then to the characteristic term of the "small" size. That is, in the above described manner, it is possible to lead a user to see the plurality of characteristic terms in a certain order.

[8] For example, it may be configured such that a term included in the product image 36 is not displayed as a characteristic term so as to be associated with the product image 36.

As described above, because a product image is generated by a shop, there may be a case in which the shop adds a term describing a characteristic of the product to the product image in order to convey the characteristic of the product to a user. In such a case, if a term same as a term which the product image 36 includes is displayed as a characteristic term so as to be associated with the product image 36, a duplicated display of the same term occurs. To address the above, it may be arranged so that a term same as a term which the product image 36 includes is not displayed as a characteristic term so as to be associated with the product image 36.

[9] For example, it is likely that a user will be interested in a term associated with a product which the user has bought in the past. Thus, a characteristic term included in the information (for example, comment information) associated with a product which a user has bought in the past from among the characteristic terms specified by the characteristic information specification unit 62 may be displayed on the list screen 30 with priority to other characteristic terms.

For example, in the case where there is a characteristic term included in information (for example, comment information) associated with a product which a user has bought in the past among the characteristic terms specified by the characteristic information specification unit 62, that characteristic term may be displayed so as to be associated with the product image 36.

Further, for example, at least one characteristic term may be selected from among the characteristic terms specified by the characteristic information specification unit 62, based on the probability information that is set such that the probability at which a characteristic term included in the information (for example, comment information) associated with a product which the user has bought in the past is selected is set higher than those at which other characteristic terms are selected, and the selected characteristic term may be displayed so as to be associated with the product image 36.

In the above described manner, it is possible to display, with priority, a characteristic term associated with a product which a user has bought in the past. That is, it becomes possible to display, with priority, a characteristic term which a user is likely to be interested in.

Note that a characteristic term associated with a product which a user has viewed in the past may be displayed with priority. It is likely that a user also will be interested in such a term, such a characteristic term may be displayed with priority. In this case, it is necessary that data on a history of products (product page) which the user has viewed in the past is stored in the data storage unit 60.

[10] For example, a display frequency or a display time of the balloon 38 (the characteristic information) may be set for each product or shop.

That is, the display control unit 66 may set a frequency or time for displaying the balloon 38 so as to be associated with the product image 36, based on at least either of information on the product and that on the shop (the provider of the product).

Note that "information on the product" includes, for example, the number of products that are sold, the number of comments, an evaluation result, the number of registrations as "my favorite", a conversion rate (the number of products that are sold relative to the number of views of the product screen), or information on stock. Such information is stored in the product information table, for example. Similarly, "information on the shop" includes, for example, information on the number of products that are sold at the shop, an evaluation result, a conversion rate, or the like. Further, for example, information as to whether or not a shop uses an advertisement service for increasing the display frequency of the balloon 38 or prolonging the display time of the balloon 38 is also included in the "information on the shop". Such information is stored in the shop information table, for example.

For example, the display control unit 66 may set the display frequency or the display time of the balloon 38, such that the display frequency or the display time of the balloon 38 displayed so as to be associated with the product image 36 of a product whose number of sales is large becomes larger than the frequency or time for displaying the balloon 38 so as to be associated with the product image 36 of a product whose number of sales is small.

Note that in order to set the display frequency (or a display time), based on the information on a product (or a shop), information on a correspondence between information on the product (or the shop) and the display frequency (or the display time) is necessary. As a result, the display control unit 66 sets the display frequency (or the display time) of the balloon 38, based on such correspondence information.

In the above described manner, it is possible to change the display frequency or the display time of the balloon 38 (the characteristic information) for each product or shop.

[11] For example, a manner of displaying the characteristic information may be changed, based on the characteristic information.

For example, the display control unit 66 may change the shape of the balloon 38 including the characteristic term specified by the characteristic information specification unit 62, based on the kind of characters included in the characteristic term.

For example, as hiragana is generally rounded, the display control unit 66 may set the shape of balloon 38 to be a rounded shape for a characteristic term written in hiragana. Meanwhile, as katakana is generally angulated, the display control unit 66 may set the shape of balloon 38 to be an angulated shape for a characteristic term written in katakana.

Further, for example, the display control unit 66 may change the typeface in which the characteristic term specified by the characteristic information specification unit 62 is written, based on the kind of characters included in the characteristic term.

For example, the display control unit 66 may use a rounded typeface for a characteristic term written in hiragana. Meanwhile, the display control unit 66 may use an angulated typeface for a characteristic term written in katakana.

[12] For example, the manner of displaying a characteristic term may be changed, based on the kind of text information including the characteristic term.

For example, different manners of displaying a characteristic term may be employed for each of a case where the characteristic term is included in the comment information and title (or the description) of the product and a case where the characteristic term is included only in the comment information of the product. For example, in the former case, the characteristic term may be displayed in a more emphasized (outstanding) manner, as compared with the latter case. That is, the larger the number of kinds of text information items including the characteristic term is, the more emphasized the manner in which the characteristic term is displayed may be.

[13] For example, it may be arranged such that a user can select a characteristic term on the list screen 30 as a condition for narrowing down the products (the product image 36). That is, when characteristic terms are displayed on the list screen 30 in a manner that they can be selected by a user and a user selects a characteristic term, products to be displayed on the list screen 30 may be narrowed down to those associated with the characteristic term selected by the user. Note here that "a product associated with the characteristic term selected by the user" refers to a product information on which (for example, comment information or the like) includes the characteristic term selected by the user.

Further, characteristic terms that can be selected by a user may be limited to those included in the information (for example, comment information or the like) of the product displayed on the list screen 30. In the above described manner, characteristic terms that can be selected by a user may be limited to those, with which at least one product is displayed on the list screen 30. In other words, a characteristic term with which no product is displayed on the list screen 30 may be eliminated from those that can be selected by a user.

[14] For example, in the case where a product image 36 with which a characteristic term is associated is selected by a user from among a plurality of product images 36 displayed on the list screen 30, a comment 52 including the characteristic term may be displayed more outstandingly than a comment 52 not including the characteristic term on the product screen 40.

In the following, a configuration for implementing the above described functions will be described. In the following, for convenience, a product image 36 selected by a user will be referred to as a "product image X", and a characteristic term associated with the product image 36 selected by the user will be referred to as a "characteristic term X".

In the above described case, the display control unit 66 displays a comment 52 including the characteristic term X among the plurality of comments 52 displayed on the product screen 40 (that is, a plurality of comments associated with the product image X) in distinction from those not including the characteristic term X.

For example, the display control unit 66 displays a predetermined character string or image so as to be associated only with the comment 52 including the characteristic term X. Further, for example, the display control unit 66 may display the comment 52 including the characteristic term X in a manner different from that for a comment 52 not including the characteristic term X. For example, the display control unit 66 may set the display size, the display color, the background color, the frame shape, or the like, of the comment 52 including the characteristic term X different from those of the comment 52 not including the characteristic term X.

Further, in the above described case, the display control unit 66 may display the comment 52 including the characteristic term X from among the plurality of comments 52 (that is, the plurality of comments associated with the product image X) displayed on the product screen 40, in preference to the comment 52 not including the characteristic term.

For example, the display control unit 66 may set a display priority of the comment 52 including the characteristic term X higher than that of the comment 52 not including the characteristic term X. That is, the display control unit 66 may display the comment 52 including the characteristic term X prior to the comment 52 not including the characteristic term X.

When a product image 36 with which a characteristic term is associated is selected by a user, it is likely that the user has selected the product image 36 because the user is interested in an onomatopoeia. Regarding this point, the above described arrangement can make it easier for a user to find a comment 52 including a characteristic term in which the user is interested.

Note that also in the case in which a user selects a product image 36 immediately after the characteristic term associated with the product image 36 disappears, it is likely that the user has selected the product image 36 as the user is interested in the characteristic term. Thus, in this case as well, processing may be executed in a manner same as that for the case where a product image 36 with which a characteristic term is associated is selected by a user.

[15] In the above, an example in which a characteristic term is specified based on a comparison between comment information of a product (referred to as a "product X" here for convenience) and comment information of other products is mainly described. That is, an example in which a term (an onomatopoeia) which is included in the comment information of the product X but is not included in the comment information of other products is obtained as a characteristic term is mainly described. However, an embodiment of the present invention is not limited to such an example.

For example, a characteristic term of the product X may be specified based on a comparison between price information of the product X and that of other products. For example, in the case where the price of the product X is lower than that of other products, a term describing so may be specified as a characteristic term of the product X. For example, "the lowest price" may be specified as a characteristic term of the product X, and may then be displayed so as to be associated with the product image 36 of the product X.

Further, for example, a characteristic term of the product X may be specified, based on a comparison between shipment time information of the product X and that of other products. For example, in the case where the shipment time of the product X is earlier than that of other products, a term describing so may be specified as a characteristic term of the product X. For example, "fastest shipment" may be specified as a characteristic term of the product X and may then be displayed so as to be associated with the product image 36 of the product X.

[16] For example, in the electronic commerce system 1, not only a product such as a bag, a drink, or the like, but also data such as, for example, electronic book data, music data, video data, or the like, may be sold as a product. Further, in the electronic commerce system 1, not only a product but also a service may be sold.

In the above, an example in which the present invention is applied to an electronic commerce system is described. That is, an example in which a display control device according to an embodiment of the present invention is implemented in an electronic commerce system is described. However, the present invention can be applied to an information processing system other than an electronic commerce system, as well. The present invention can be applied to an information processing system for displaying a screen image including an image on a display unit.

Further, for example, the present invention can be applied to a terminal for reproducing content such as electronic book, music, video, or the like. For example, in such a terminal, characteristic information of content may be displayed on a screen showing a list of images of contents so as to be associated with an image.

For example, when the time and date when a content (referred to as "content X" here for convenience) is last reproduced is earlier than those of other contents, a term describing so may be specified as a characteristic term of the content X, and may then be displayed so as to be associated with the image of the content X.

Further, for example, in the case where only the category of the content X is different from those of other contents, a term describing so may be specified as a characteristic term of the content X. For example, when only the content X is a "comic", a term describing so may be specified as a characteristic term of the content X, and may then be displayed so as to be associated with the image of the content X.

Further, for example, in the case where the rank of the content X is higher than those of other contents, a term describing so may be specified as a characteristic term of the content X, and may then be displayed so as to be associated with the image of the content X.

Further, the present invention is applicable to a system for introducing a facility (for example, an accommodation facility or the like) or a shop (for example, a restaurant, a beauty salon or the like). In such a system, for example, characteristic information of a shop or a facility may be displayed on a screen showing a list of images of facilities or shops so as to be associated with an image.

For example, in the case where special privilege offered by a facility or a shop (referred to as "a facility X or a shop X" here for convenience) is different from those offered by other facilities or shops, a term describing so may be specified as a characteristic term of the facility X or the shop X, and may then be displayed so as to be associated with the image of the facility X or the shop X.

Further, for example, in the case where the location of the facility X or the shop X is closer to the address of a user than those of other facilities or shops, a term describing so may be specified as a characteristic term of the facility X or the shop X, and may then be displayed so as to be associated with the image of the facility X or the shop X.

Further, the present invention is applicable to a system for introducing a cooking recipe. For example, in such a system, characteristic information of a recipe may be displayed so as to be associated with an image, on a screen image showing a list of recipe images.

For example, a cooking time of a recipe (referred to as a "recipe X" here for convenience) is shorter than those of other recipes, a term describing so may be specified as a characteristic term of the recipe X. Alternatively, in the case where the recipe X includes an ingredient not included in other recipes, a term describing so may be specified as a characteristic term of the recipe X. Still alternatively, the ingredient cost of the recipe X is lower than those of other recipes, a term describing so may be specified as a characteristic term of the recipe X. Then, the above described characteristic terms may be displayed so as to be associated with the image of the recipe X.

Further, the present invention is applicable to a system for introducing a hair style. For example, in such a system, characteristic information of a hair style may be displayed so as to be associated with an image, on a screen showing a list of images of hair styles.

For example, in the case where a hair style (referred to as "hair style X" here for convenience) is different from other hair styles at only its category, a term to that effect may be specified as a characteristic term of the hair style X, and may then be displayed so as to be associated with the image of the hair style X.

The invention claimed is:

1. A display control device, comprising:
   a processor; and
   a memory device that stores a plurality of instructions, wherein when the processor executes the plurality of instructions in the memory device, the processor is operable to:
   obtain characteristic information of an object of one image among a plurality of images, the characteristic information being specified by specifying characteristic information of the object of the one image as compared with an object of another image among the plurality of images based on information being associated with the one image and concerning the object of the one image and information being associated with the other image and concerning the object of the other image; and
   display a screen image including the plurality of images on a display, and display the characteristic information so as to be associated with the one image
   wherein the plurality of images are images relating to a plurality of products or services,
   the information associated with the one image includes first comment information on a first product or a first service relating to the one image, which is registered by a purchaser of the first product or the first service, and
   the information associated with the other image includes second comment information on a second product or a second service relating to the other image, which is registered by a purchaser of the second product or the second service,
   wherein the processor obtains the characteristic information by extracting a characteristic term which indicates a characteristic of the first product or the first service relating to the one image as compared with the second product or the second service relating to the other image, from among terms included in the first comment information, based on a term included in the second comment information,
   displays the extracted characteristic term in association with the one image, and
   wherein the characteristic term is a term which is included in the first comment information but is not included in the second comment information, or a term which is included in both the first comment information and the second comment information, and a number of appearances of which in the first comment information is larger than that of which in the second comment information.

2. The display control device according to claim 1, wherein
   the processor is operable to specify relative characteristic information of the object of the one image relative to the object of the other image, based on the information associated with the one image and the information associated with the other image.

3. The display control device according to claim 2, wherein
   the information associated with the one image includes text information concerning the object of the one image,
   the information associated with the other image includes text information concerning the object of the other image, and
   the processor is operable to specify a term included in the text information associated with the one image but not included in the text information associated with the other image as the relative characteristic information.

4. The display control device according to claim 1, wherein
   the processor is operable to specify characteristic information that is common to the object of the one image and the object of the other image, based on the information associated with the one image and the information associated with the other image, the other image showing an object same as or similar to the object of the one image.

5. The display control device according to claim 4, wherein
the information associated with the one image includes text information concerning the object of the one image,
the information associated with the other image includes text information concerning the object of the other image, and
the processor is operable to specify a term included in the text information associated with the one image and also included in the text information associated with the other image as the characteristic information.

6. The display control device according to claim 1, wherein
the plurality of images showing objects that satisfy a search condition are shown in the screen image, and
the processor is operable to exclude information set as the search condition from the characteristic information.

7. The display control device of claim 1, where said characteristic term is an onomatopoeia.

8. The display control device of claim 7, wherein the processor extracts the onomatopoeia based on list data including a list of onomatopoeias.

9. The display control device of claim 7, wherein the processor extracts, as the onomatopoeia, a term having a character pattern of "ABAB", where each of 'A' and 'B' represent a one syllable sound.

10. The display control device of claim 1, wherein a stop word list is checked before displaying the onomatopoeia word.

11. A control method for a display control device, comprising:
obtaining characteristic information of an object of one image among a plurality of images, the characteristic information being specified by specifying characteristic information of the object of the one image as compared with an object of another image among the plurality of images based on information being associated with the one image and concerning the object of the one image and information being associated with the other image and concerning the object of the other image; and
displaying a screen image including the plurality of images on a display, and displaying the characteristic information so as to be associated with the one image
wherein the plurality of images are images relating to a plurality of products or services,
the information associated with the one image includes first comment information on a first product or a first service relating to the one image, which is registered by a purchaser of the first product or the first service, and
the information associated with the other image includes second comment information on a second product or a second service relating to the other image, which is registered by a purchaser of the second product or the second service,
the obtaining comprises obtaining the characteristic information by extracting a characteristic term which indicates a characteristic of the first product or the first service relating to the one image as compared with the second product or the second service relating to the other image, from among terms included in the first comment information, based on a term included in the second comment information,
the displaying comprises displaying the extracted characteristic term in association with the one image, and
wherein the characteristic term is a term which is included in the first comment information but is not included in the second comment information, or a term which is included in both the first comment information and the second comment information, and a number of appearances of which in the first comment information is larger than that of which in the second comment information.

12. A non-transitory computer readable information storage medium storing a program for causing a computer to:
obtain characteristic information of an object of one image among a plurality of images, the characteristic information being specified by specifying characteristic information of the object of the one image as compared with an object of another image among the plurality of images based on information being associated with the one image and concerning the object of the one image and information being associated with the other image and concerning the object of the other image; and
display a screen image including the plurality of images on a display, and display the characteristic information so as to be associated with the one image,
wherein the plurality of images are images relating to a plurality of products or services,
the information associated with the one image includes first comment information on a first product or a first service relating to the one image, which is registered by a purchaser of the first product or the first service, and
the information associated with the other image includes second comment information on a second product or a second service relating to the other image, which is registered by a purchaser of the second product or the second service,
wherein the computer obtains the characteristic information by extracting a characteristic term which indicates a characteristic of the first product or the first service relating to the one image as compared with the second product or the second service relating to the other image, from among terms included in the first comment information, based on a term included in the second comment information, and
displays the extracted characteristic term in association with the one image, and
wherein the characteristic term is a term which is included in the first comment information but is not included in the second comment information or a term which is included in both the first comment information and the second comment information, and a number of appearances of which in the first comment information is larger than that of which in the second comment information.

* * * * *